US012634991B2

(12) United States Patent
Chen et al.

(10) Patent No.: US 12,634,991 B2
(45) Date of Patent: May 19, 2026

(54) ANTI-MOTION AND ANTI-INTERFERENCE FRAME EXCHANGE SEQUENCES IN WIRELESS COMMUNICATIONS

(71) Applicant: MediaTek Inc., Hsinchu (TW)

(72) Inventors: Li-Chieh Chen, Hsinchu (TW);
Kuo-Wei Chen, Hsinchu (TW);
Chia-Jung Hsu, Hsinchu (TW);
Yi-Hsuan Chung, Hsinchu (TW);
Ming-Hsiang Tseng, Hsinchu (TW);
Wei-Hsu Chen, Hsinchu (TW);
Cheng-En Hsieh, Hsinchu (TW)

(73) Assignee: MediaTek Inc., Hsinchu City (TW)

( * ) Notice: Subject to any disclaimer, the term of this patent is extended or adjusted under 35 U.S.C. 154(b) by 294 days.

(21) Appl. No.: 18/376,669

(22) Filed: Oct. 4, 2023

(65) Prior Publication Data

US 2024/0188130 A1     Jun. 6, 2024

Related U.S. Application Data

(60) Provisional application No. 63/385,793, filed on Dec. 2, 2022.

(51) Int. Cl.
H04W 74/0816 (2024.01)

(52) U.S. Cl.
CPC .............................. H04W 74/0816 (2013.01)

(58) Field of Classification Search
CPC ...... H04L 1/0013; H04L 5/001; H04W 74/04; H04W 74/0446; H04W 74/0808; H04W 74/0816; H04W 84/12; H04W 72/0446

USPC .......................................... 370/230, 329, 330
See application file for complete search history.

(56) References Cited

U.S. PATENT DOCUMENTS

2019/0215037 A1* 7/2019 Seok ..................... H04L 1/0013
2024/0146456 A1* 5/2024 Chun ................ H04W 72/0446

FOREIGN PATENT DOCUMENTS

EP          3706358 A1     9/2020

OTHER PUBLICATIONS

European Patent Office, Extended European Search Report in European Patent Application No. 23212357.0-1215, Apr. 9, 2024.
"36. Extremely high throughput (EHT) PHY specification 36.1 Introduction 36.1.1 Introduction to the Eht Phy", IEEE Draft; TGBE_CL_36, IEEE-SA, Piscataway, NJ USA, vol. 802.11be drafts, No. D2.3, Dec. 1, 2022 (Dec. 1, 2022), pp. 1-268, XP068194558.

* cited by examiner

*Primary Examiner* — Harun Chowdhury
(74) *Attorney, Agent, or Firm* — Andy M. Han; Han IP PLLC

(57) ABSTRACT

Techniques pertaining to anti-motion and anti-interference frame exchange sequences in wireless communications are described. A station (STA), such as a Wi-Fi equipment, determines to enable a frame exchange sequence (FES). The STA then communicates with one or more other STAs by utilizing the FES in which preamble puncturing sounding and data transmission are performed in a same transmission opportunity (TXOP).

14 Claims, 8 Drawing Sheets

600

DETERMINE, BY A PROCESSOR OF A STATION (STA), TO ENABLE A FRAME EXCHANGE SEQUENCE (FES)

610

COMMUNICATE, BY THE PROCESSOR, WITH ONE OR MORE OTHER STAs BY UTILIZING THE FES IN WHICH PREAMBLE PUNCTURING SOUNDING AND DATA TRANSMISSION ARE PERFORMED IN A SAME TRANSMISSION OPPORTUNITY (TXOP)

620

100

STA 120

WIRELESS COMMUNICATIONS WITH ANTI-MOTION AND ANTI-INTERFERENCE FRAME EXCHANGE SEQUENCE (FES)

STA 110

Figure 6:
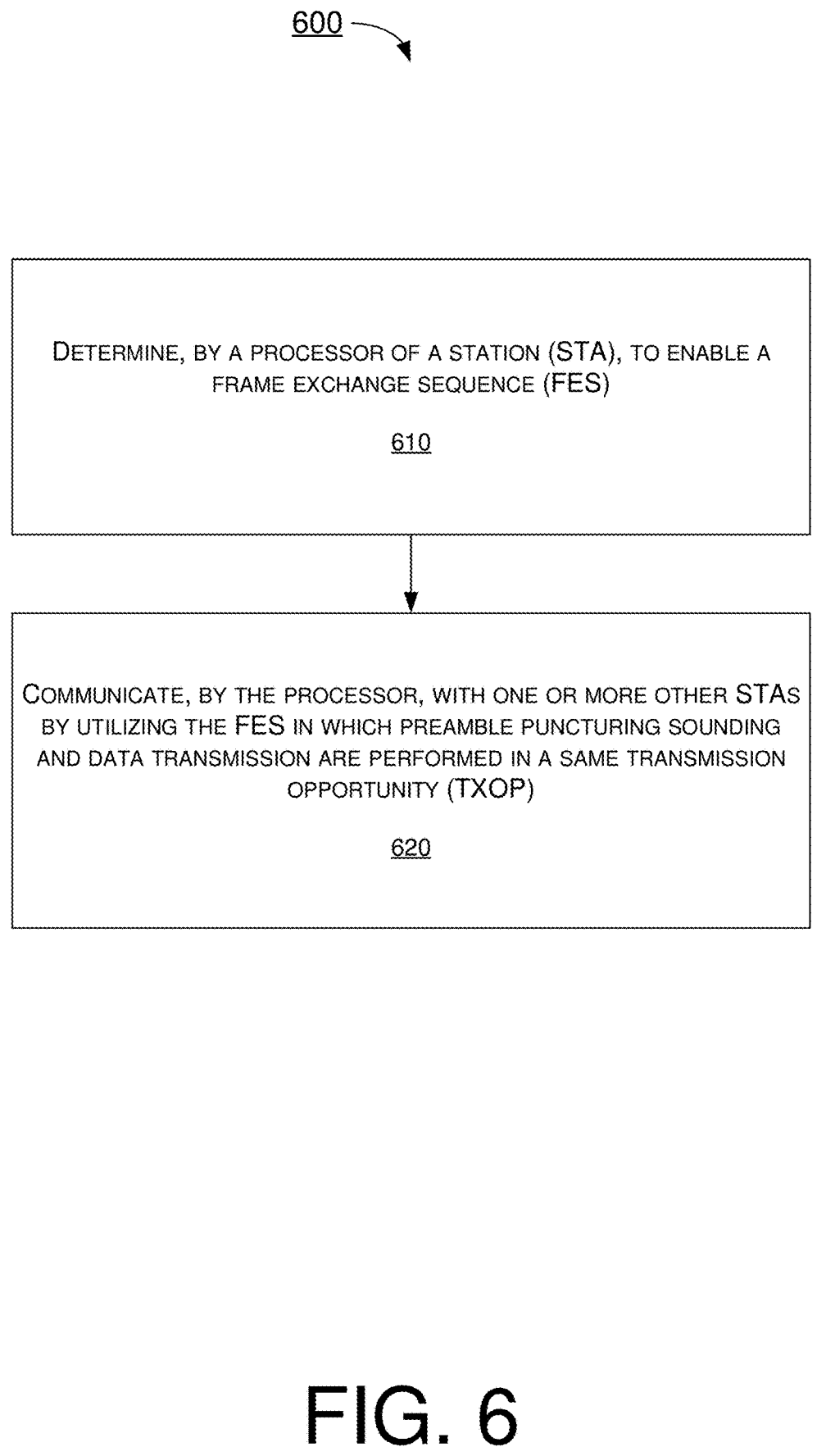

600 —↘

DETERMINE, BY A PROCESSOR OF A STATION (STA), TO ENABLE A
FRAME EXCHANGE SEQUENCE (FES)

610

COMMUNICATE, BY THE PROCESSOR, WITH ONE OR MORE OTHER STAS
BY UTILIZING THE FES IN WHICH PREAMBLE PUNCTURING SOUNDING
AND DATA TRANSMISSION ARE PERFORMED IN A SAME TRANSMISSION
OPPORTUNITY (TXOP)

ANTI-MOTION AND ANTI-INTERFERENCE FRAME EXCHANGE SEQUENCES IN WIRELESS COMMUNICATIONS

CROSS REFERENCE TO RELATED PATENT APPLICATION

The present disclosure is part of a non-provisional patent application claiming the priority benefit of U.S. Provisional Patent Application No. 63/385,793, filed 2 Dec. 2022, the content of which herein being incorporated by reference in its entirety.

TECHNICAL FIELD

The present disclosure is generally related to wireless communications and, more particularly, to anti-motion and anti-interference frame exchange sequences in wireless communications.

BACKGROUND

Unless otherwise indicated herein, approaches described in this section are not prior art to the claims listed below and are not admitted as prior art by inclusion in this section.

With evermore deployment of wireless networks, such as WiFi (Wi-Fi) and wireless local area networks (WLANs) in accordance with one or more Institute of Electrical and Electronics Engineers (IEEE) standards, more and more wireless devices suffer interference in environment in which wireless networking is densely deployed. In the IEEE 802.11ax/be specifications, sounding, data transmission and preamble puncturing are different and independent mechanisms. In case that sounding and data puncturing are not synchronized, data may be corrupted due to inappropriate sounding being applied. For example, when sounding puncturing is in one non-orthogonal frequency-division multiple-access (non-OFDMA) multi-resource unit (MRU) (e.g., non-OFDMA MRU 2) while data puncturing is in another non-OFDMA MRU (e.g., non-OFDMA MRU 3), data may be corrupted the sounding puncturing profile is applied to that data. Therefore, there is a need for a solution of anti-motion and anti-interference frame exchange sequences in wireless communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to anti-motion and anti-interference frame exchange sequences in wireless communications. It is believed that implementations of one or more schemes proposed herein may mitigate impacts of motion and/or interference in wireless devices (e.g., Wi-Fi equipment). Thus, it is believed that various schemes proposed herein may address or otherwise alleviate the aforementioned issue(s), such as reduction in performance overhead.

In one aspect, a method may involve a station (STA) determining to enable a frame exchange sequence (FES). The method may also involve the STA communicating with one or more other STAs by utilizing the FES in which preamble puncturing sounding and data transmission are performed in a same transmission opportunity (TXOP).

In another aspect, an apparatus implementable in a STA may include a transceiver configured to communicate wirelessly and a processor coupled to the transceiver. The processor may determine to enable a FES. The processor may also communicate, via the transceiver, with one or more other STAs by utilizing the FES in which preamble puncturing sounding and data transmission are performed in a same TXOP.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IOT), Industrial IoT (IIoT) and narrowband IoT (NB-IOT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

Each of FIG. 3A

Each of FIG. 4A

FIG. 6 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to anti-motion and anti-interference frame exchange sequences in wireless communications. According to the present disclosure, a number of possible solutions may be implemented separately or jointly. That is, although these possible solutions may be described below separately, two or more of these possible solutions may be implemented in one combination or another.

Figure 1:
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 6 illustrate examples of implementation of various proposed schemes in network environment 100 in accordance with the present disclosure. The following description of various proposed schemes is provided with reference to FIG. 1~FIG. 6.

Referring to FIG. 1, network environment 100 may involve at least a first STA, or STA 110, communicating wirelessly with a second STA, or STA 120. Either of STA 110 and STA 120 may function an access point (AP) STA or a non-access point (non-AP) STA. In some cases, STA 110 and STA 120 may be associated with a basic service set (BSS) in accordance with one or more IEEE 802.11 standards (e.g., IEEE 802.11be and future-developed standards). Each of STA 110 and STA 120 may be configured to communicate with each other by utilizing the techniques pertaining to anti-motion and anti-interference frame exchange sequences in wireless communications in accordance with various proposed schemes described below. It is noteworthy that, while the various proposed schemes may be individually or separately described below, in actual implementations some or all of the proposed schemes may be utilized or otherwise implemented jointly. Of course, each of the proposed schemes may be utilized or otherwise implemented individually or separately.

Under various proposed schemes in accordance with the present disclosure, a new FES may utilize preamble puncturing sounding with data frame in a same TXOP. Under the proposed schemes, the new FES may achieve improved channel measurement physically in a TXOP, thereby mitigating impacts of motion and interference while increasing data rate physically. Under the proposed schemes, data transmission may be applied with a best sounding steering matrix since the sounding steering matrix may be applied immediately in the following data. Moreover, the issue of data corruption may be solved since sounding and data puncturing may be independently implemented under the proposed schemes.

Figure 2:
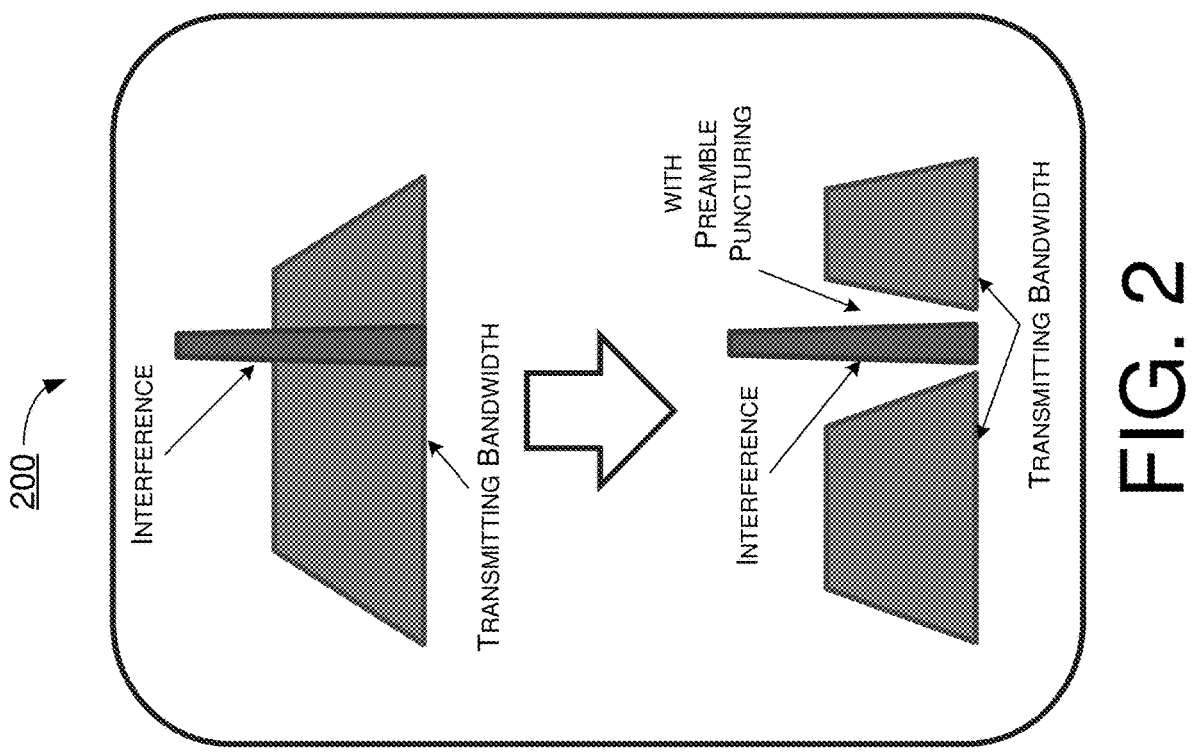
FIG. 2 is a diagram of an example scenario under a proposed scheme in accordance with the present disclosure.

FIG. 2 illustrates an example scenario 200 under a proposed scheme in accordance with the present disclosure. Scenario 200 may pertain to preamble puncturing sounding with a data frame in the same TXOP. Based on the IEEE 802.11be specification, non-OFDMA MRU may be supported to realize single-user multiple-input-multiple-output (SU-MIMO) and multi-user multiple-input-multiple-output (MU-MIMO) preamble puncturing (PP) in extremely high-throughput (EHT) physical-layer protocol data units (PP-DUs). Preamble puncturing may help avoid interference in an environment with dense wireless communications.

Figure 3A:
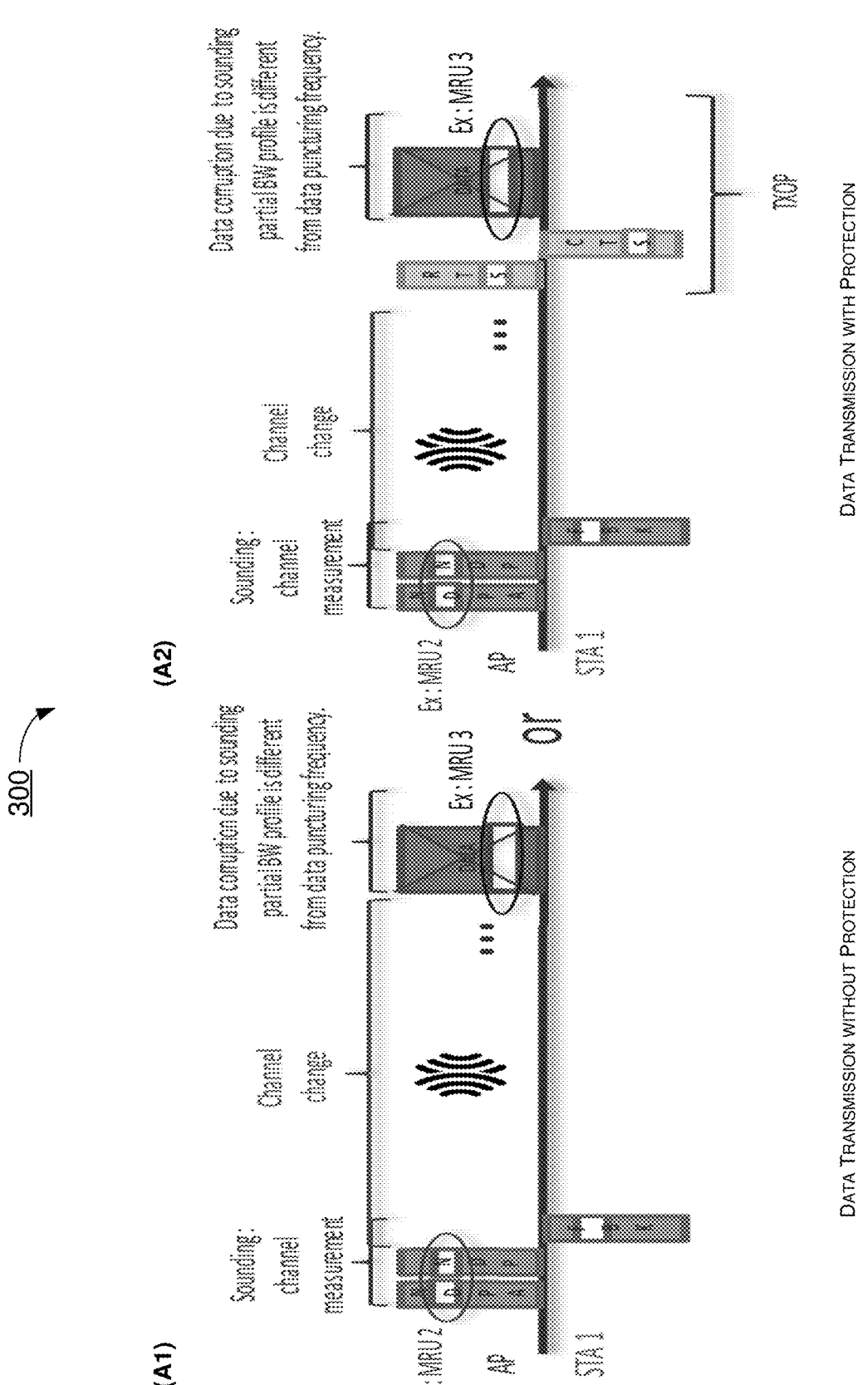
FIG. 3B is a diagram of a respective portion of an example scenario under a proposed scheme in accordance with the present disclosure.
Figure 3B:
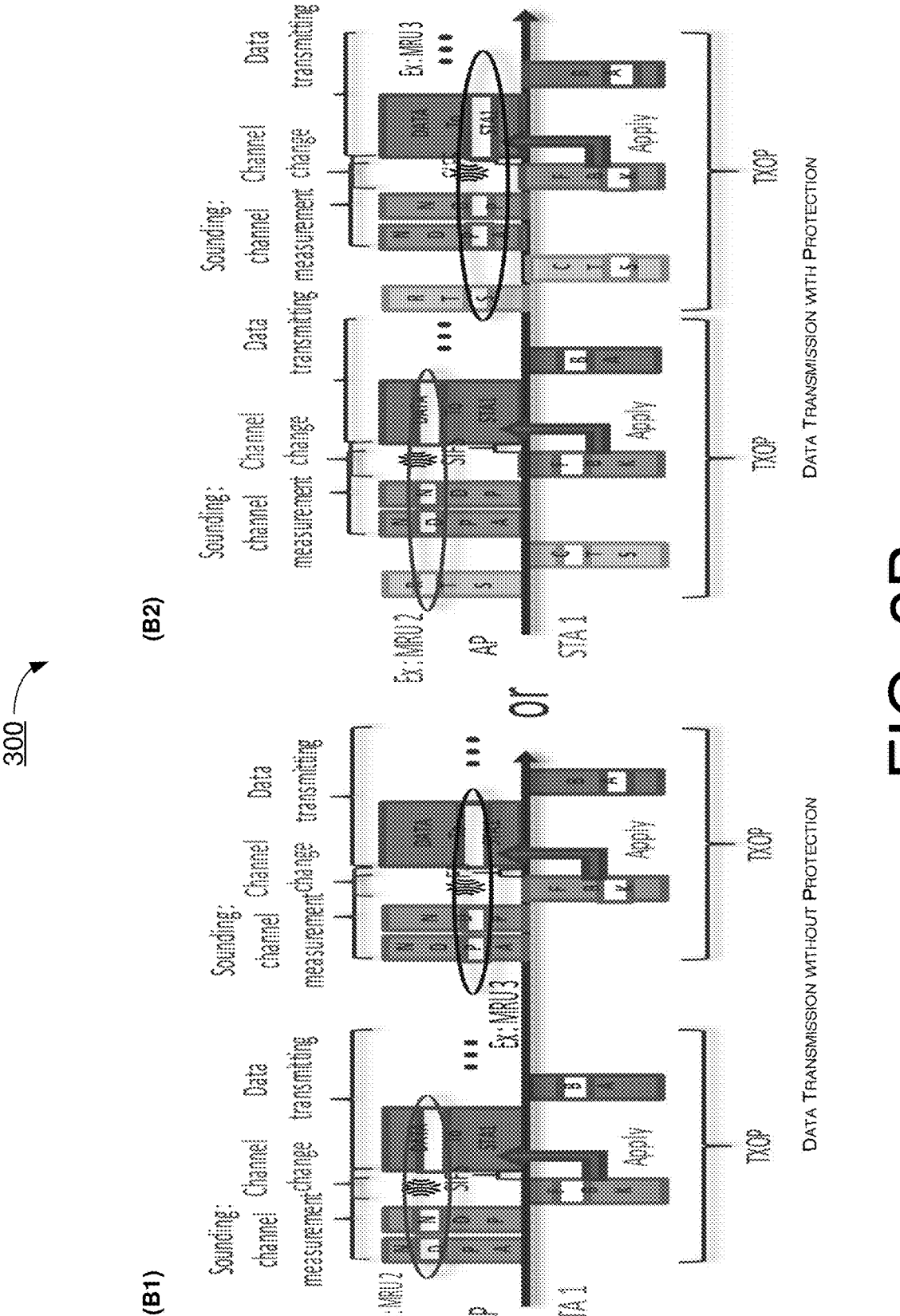

FIG. 3A and FIG. 3B each illustrates a respective portion of an example scenario 300 under a proposed scheme in accordance with the present disclosure. Scenario 300 may pertain to data transmission in the context of SU-MIMO in which an AP communicates with a single STA (e.g., STA 1). According to current IEEE 802.11 specifications, sounding, data and preamble puncturing FESs are performed or otherwise carried out independently. Referring to part (A1) of FIG. 3A, data transmission may be performed without protection. Although sounding channel measurement may have been performed initially, channel condition may change (e.g., due to motion by a user and/or interference) sometime after such sounding channel measurement, and such change in channel condition may lead to data corruption due to sounding partial bandwidth (BW) profile being different from a data puncturing frequency. Referring to part (A2) of FIG. 3A, data transmission may be performed with protection (e.g., data transmission occurring after an exchange of request-to-send (RTS) and clear-to-send (CTS)). Although sounding channel measurement may have been performed initially, channel condition may change (e.g., due to motion by a user and/or interference) sometime after such sounding channel measurement, and such change in channel condition may lead to data corruption due to sounding partial BW profile being different from the data puncturing frequency.

Under the proposed scheme, in a new FES, preamble puncturing sounding and data frame transmission may be performed in the same TXOP. Referring to part (B1) of FIG. 3B, data transmission may be performed without protection. As sounding channel measurement and data transmission are performed in the same TXOP, a sounding steering matrix may be applied to data transmission based on beamforming feedback provided by STA 1, thereby avoiding data corruption even though channel condition may change after sounding channel measurement (as the data condition change may be accounted for in the sounding steering matrix based on the beamforming feedback). Referring to part (B2) of FIG. 3B, data transmission may be performed with protection (e.g., data transmission occurring after an exchange of RTS and CTS). As sounding channel measurement and data transmission are performed in the same TXOP, a sounding steering matrix may be applied to data transmission based on beamforming feedback provided by STA 1, thereby avoiding data corruption even though channel condition may change after sounding channel measurement (as the data condition change may be accounted for in the sounding steering matrix based on the beamforming feedback).

Figure 4A:
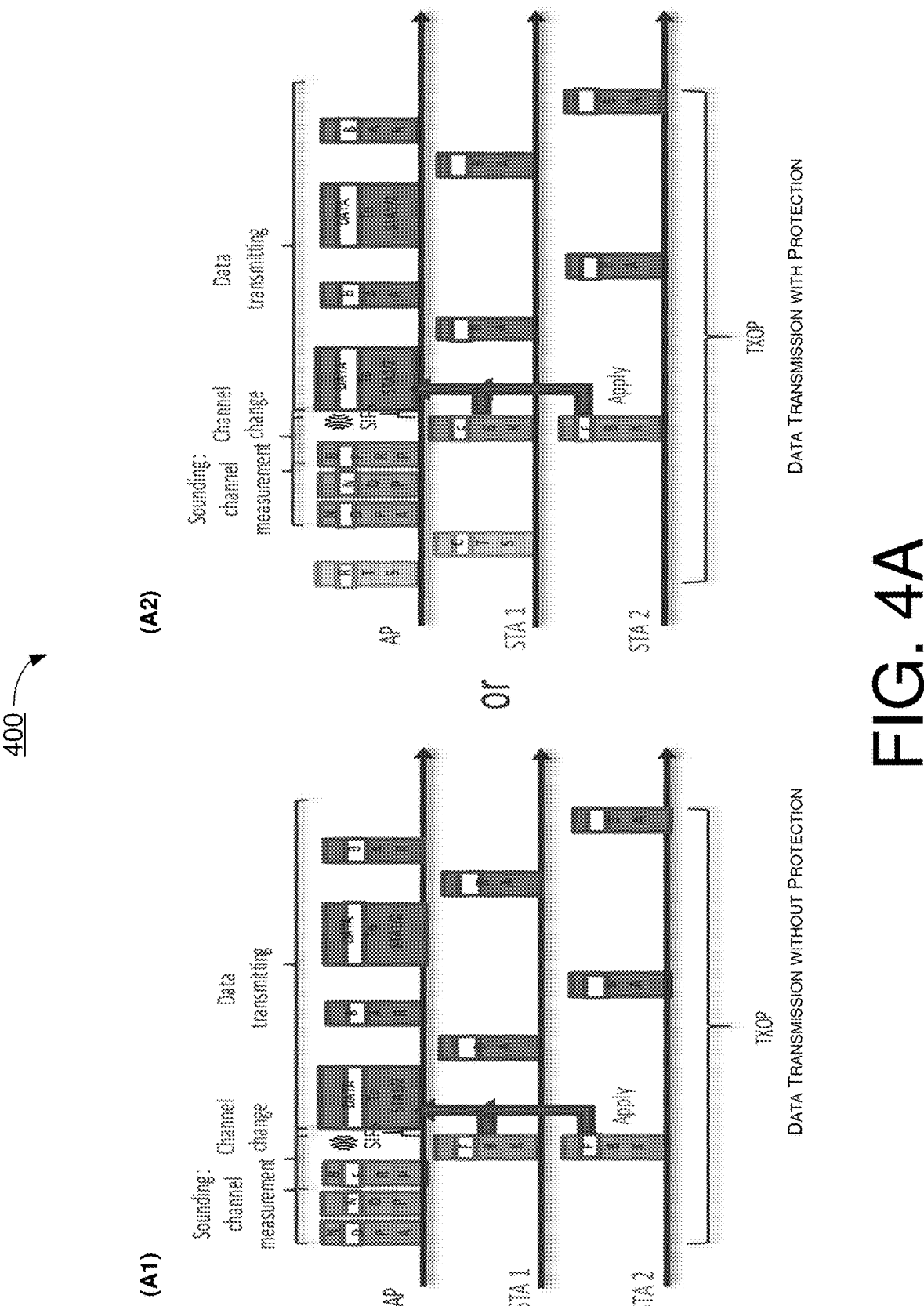
FIG. 4B is a diagram of a respective portion of an example scenario under a proposed scheme in accordance with the present disclosure.
Figure 4B:
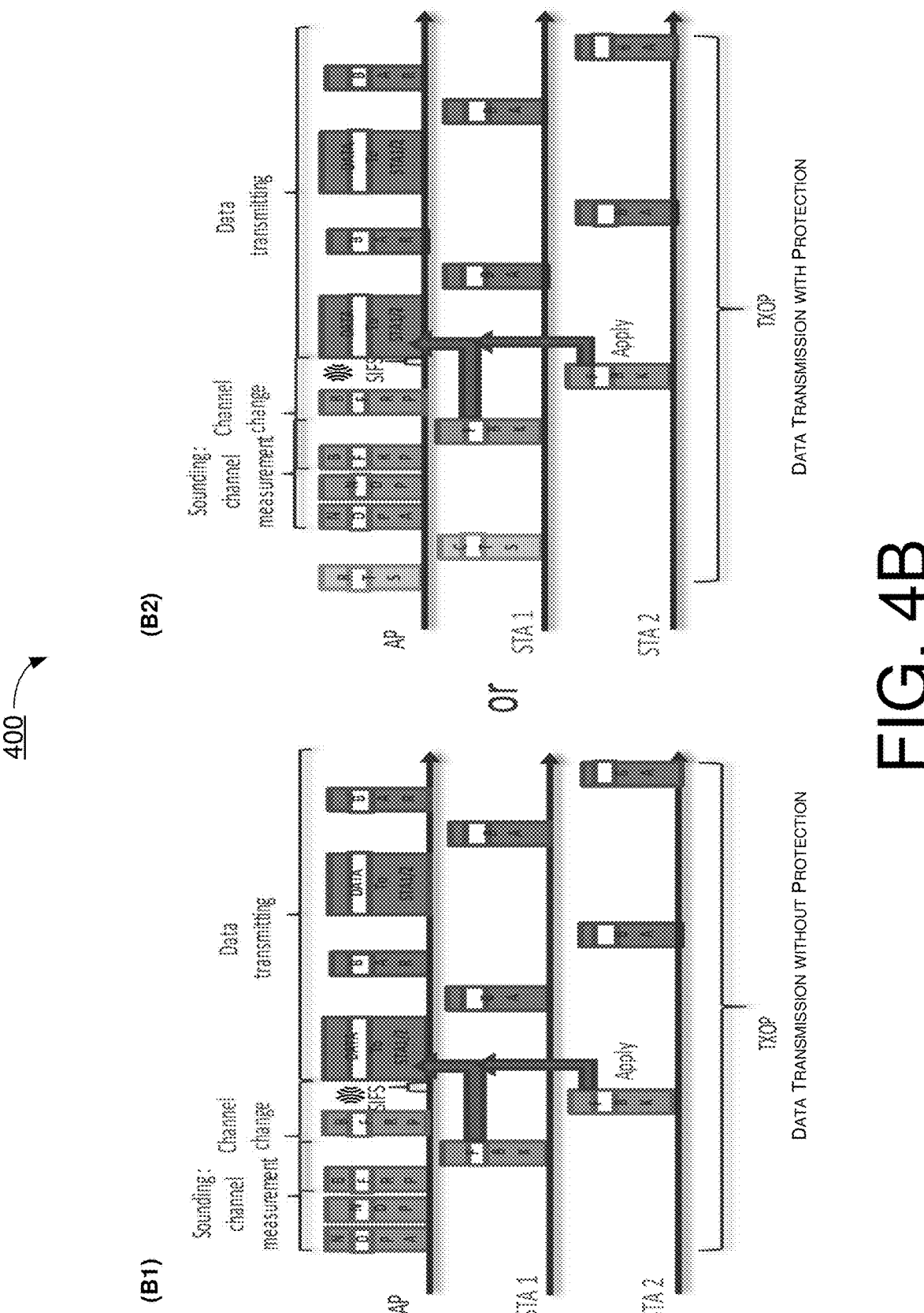

FIG. 4A and FIG. 4B each illustrates a respective portion of an example scenario 400 under a proposed scheme in accordance with the present disclosure. Scenario 400 may pertain to data transmission in the context of MU-MIMO in which an AP communicates with multiple STAs (e.g., STA 1 and STA 2). Under the proposed scheme, in a new FES, preamble puncturing sounding and data frame transmission may be performed in the same TXOP.

Referring to part (A1) of FIG. 4A, data transmission may be performed without protection. As sounding channel measurement and data transmission are performed in the same TXOP, a sounding steering matrix may be applied to data transmission based on the beamforming feedbacks from STA 1 and STA 2, thereby avoiding data corruption even though channel condition may change after sounding channel measurement (as the data condition change may be accounted for in the sounding steering matrix based on the beamforming feedbacks). In the example shown in part (A1) of FIG. 4A, each of STA 1 and STA 2 provides respective beamforming feedback in response to a beamforming feedback report poll transmitted by the AP. Referring to part (A2) of FIG. 4A data transmission may be performed with protection (e.g., data transmission occurring after an exchange of RTS and CTS). As sounding channel measurement and data transmission are performed in the same TXOP, a sounding steering matrix may be applied to data transmission based on the beamforming feedbacks provided by STA 1 and STA 2, thereby avoiding data corruption even though channel condition may change after sounding channel measurement (as the data condition change may be accounted for in the sounding steering matrix based on the beamforming feedbacks). In the example shown in part (A2) of FIG. 4A, the exchange of RTS and CTS between AP and STA1 provides protection on the data transmission that occurs after the RTS/CTS exchange.

Referring to part (B1) of FIG. 4B, data transmission may be performed without protection. As sounding channel measurement and data transmission are performed in the same TXOP, a sounding steering matrix may be applied to data transmission based on beamforming feedbacks provided by STA 1 and STA 2, thereby avoiding data corruption even though channel condition may change after sounding channel measurement (as the data condition change may be accounted for in the sounding steering matrix based on the beamforming feedbacks). In the example shown in part (B1) of FIG. 4B, each of STA 1 and STA 2 provides respective beamforming feedback separately in response to a respective beamforming feedback report poll transmitted by the AP. Referring to part (B2) of FIG. 4B data transmission may be performed with protection (e.g., data transmission occurring after an exchange of RTS and CTS). As sounding channel measurement and data transmission are performed in the same TXOP, a sounding steering matrix may be applied to data transmission based on the beamforming feedbacks provided by STA 1 and STA 2, thereby avoiding data corruption even though channel condition may change after sounding channel measurement (as the data condition change may be accounted for in the sounding steering matrix based on the beamforming feedbacks). In the example shown in part (B2) of FIG. 4B, each of STA 1 and STA 2 provides respective beamforming feedback separately in response to a respective beamforming feedback report poll transmitted by the AP.

Under a proposed scheme in accordance with the present disclosure, the new FES, in which preamble puncturing sounding and data frame transmission are performed in the same TXOP, may be enabled based on a trigger or indication. For instance, the new FES may be enabled or otherwise implemented in response to one or more of the following parameters reaching or exceeding its respective threshold: adjacent channel interference, packet error rate, and received signal strength indicator (RSSI).

In view of the above, it is believed that one of ordinary skill in the art would appreciate that various proposed schemes of the present disclosure may mitigate impacts of motion and/or interference on Wi-Fi equipment. It is noteworthy that the proposed schemes may be applied or implemented in environments with motion and without interference, so that Wi-Fi equipment may attain the optimal channel measurement physically in a given TXOP. The various proposed schemes may be implemented in hardware form (e.g., a processor with electronic circuitry) that applies a sounding steering matrix in data transmission that follows sounding channel measurement in the same TXOP. The various proposed schemes may be applied to multi-user PPDU (MU-PPDU) and/or trigger-based (TB) PPDU for both downlink (DL) and uplink (UL) traffics. The various proposed schemes may also be applied to single-link and multi-link scenarios, including multi-link operation (MLO) scenarios. Moreover, the various proposed schemes may be applied or otherwise implemented in future-generation Wi-Fi deployments including those after Wi-Fi 4. It is also noteworthy that, although examples described above and depicted in the figures may be in the context of an AP STA communicating with one or more non-AP STAs, various proposed schemes of the present disclosure may also be implemented in scenarios in which one non-AP STA communicates one or more other non-AP STAs as well as other scenarios in which one AP STA communicating with one or more other AP STAs.

Illustrative Implementations

Figure 5:
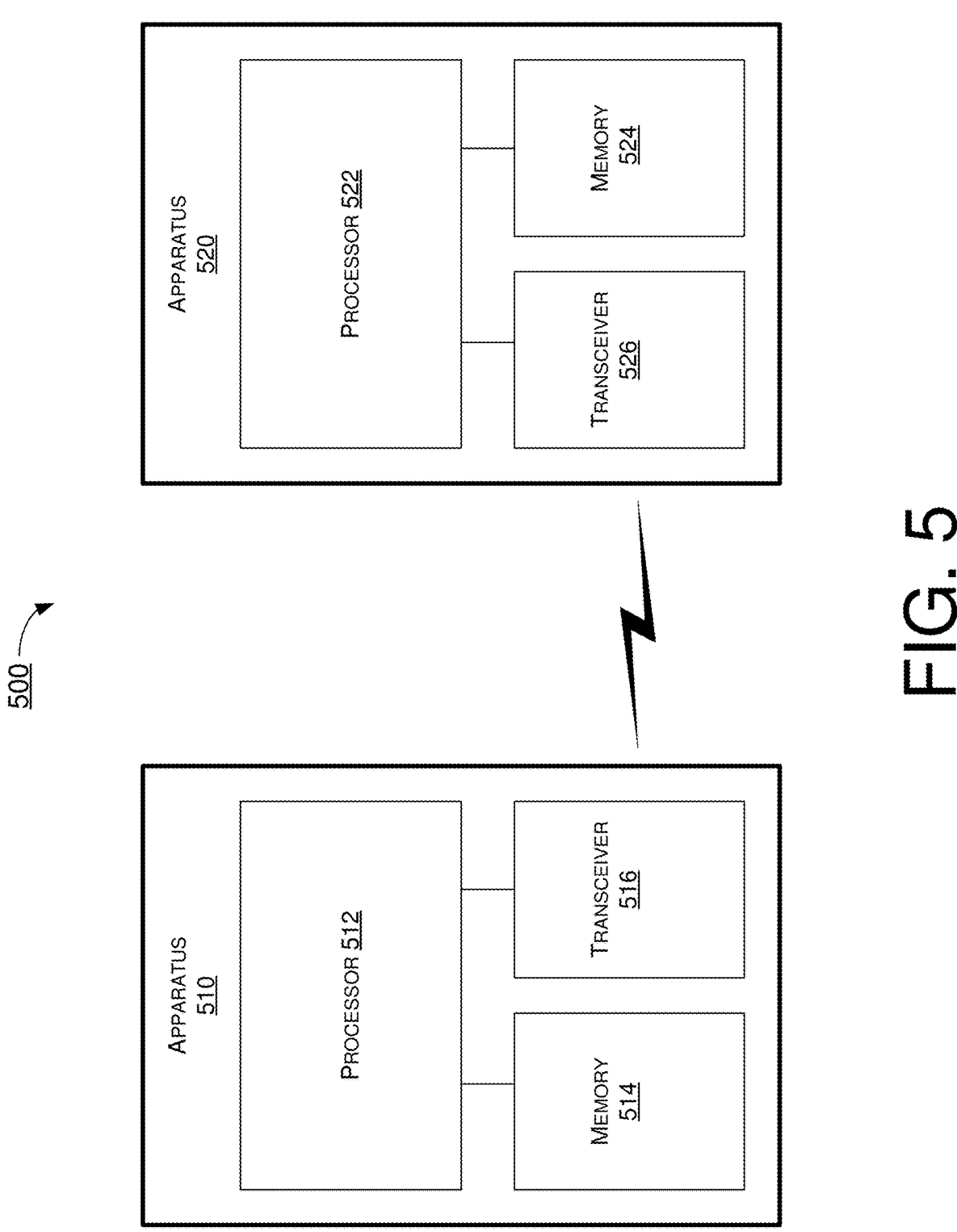
FIG. 5 is a block diagram of an example communication system in accordance with an implementation of the present disclosure.

FIG. 5 illustrates an example communication system 500 having at least an example apparatus 510 and an example apparatus 520 in accordance with an implementation of the present disclosure. Each of apparatus 510 and apparatus 520 may perform various functions to implement schemes, techniques, processes and methods described herein pertaining to anti-motion and anti-interference frame exchange sequences in wireless communications, including the various schemes described above with respect to various proposed designs, concepts, schemes, systems and methods described above as well as processes described below. For instance, apparatus 510 may be implemented in STA 110 and apparatus 520 may be implemented in STA 120, or vice versa.

Each of apparatus 510 and apparatus 520 may be a part of an electronic apparatus, which may be a non-AP STA or an AP STA, such as a portable or mobile apparatus, a wearable apparatus, a wireless communication apparatus or a computing apparatus. When implemented in a STA, each of apparatus 510 and apparatus 520 may be implemented in a smartphone, a smart watch, a personal digital assistant, a digital camera, or a computing equipment such as a tablet computer, a laptop computer or a notebook computer. Each of apparatus 510 and apparatus 520 may also be a part of a machine type apparatus, which may be an IoT apparatus such as an immobile or a stationary apparatus, a home apparatus, a wire communication apparatus or a computing apparatus. For instance, each of apparatus 510 and apparatus 520 may be implemented in a smart thermostat, a smart fridge, a smart door lock, a wireless speaker or a home control center. When implemented in or as a network apparatus, apparatus 510 and/or apparatus 520 may be implemented in a network node, such as an AP in a WLAN.

In some implementations, each of apparatus 510 and apparatus 520 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 510 and apparatus 520 may be implemented in or as a STA or an AP. Each of apparatus 510 and apparatus 520 may include at least some of those components shown in FIG. 5 such as a processor 512 and a processor 522, respectively, for example. Each of apparatus 510 and apparatus 520 may further include one or more other components not pertinent to the proposed scheme of the present disclosure (e.g., internal power supply, display device and/or user interface device), and, thus, such component(s) of apparatus 510 and apparatus 520 are neither shown in FIG. 5 nor described below in the interest of simplicity and brevity.

In one aspect, each of processor 512 and processor 522 may be implemented in the form of one or more single-core processors, one or more multi-core processors, one or more RISC processors or one or more CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including those pertaining to anti-motion and anti-interference frame exchange sequences in wireless communications in accordance with various implementations of the present disclosure.

In some implementations, apparatus 510 may also include a transceiver 516 coupled to processor 512. Transceiver 516 may include a transmitter capable of wirelessly transmitting and a receiver capable of wirelessly receiving data. In some implementations, apparatus 520 may also include a transceiver 526 coupled to processor 522. Transceiver 526 may include a transmitter capable of wirelessly transmitting and a receiver capable of wirelessly receiving data. It is noteworthy that, although transceiver 516 and transceiver 526 are illustrated as being external to and separate from processor 512 and processor 522, respectively, in some implementations, transceiver 516 may be an integral part of processor 512 as a system on chip (SoC) and/or transceiver 526 may be an integral part of processor 522 as a SoC.

In some implementations, apparatus 510 may further include a memory 514 coupled to processor 512 and capable of being accessed by processor 512 and storing data therein. In some implementations, apparatus 520 may further include a memory 524 coupled to processor 522 and capable of being accessed by processor 522 and storing data therein. Each of memory 514 and memory 524 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 514 and memory 524 may include a type of read-only memory (ROM) such as mask ROM, programmable ROM (PROM), erasable programmable ROM (EPROM) and/or electrically erasable programmable ROM (EEPROM). Alternatively, or additionally, each of memory 514 and memory 524 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 510 and apparatus 520 may be a communication entity capable of communicating with each other using various proposed schemes in accordance with the present disclosure. For illustrative purposes and without limitation, a description of capabilities of apparatus 510, as STA 110, and apparatus 520, as STA 120, is provided below. It is noteworthy that, although a detailed description of capabilities, functionalities and/or technical features of apparatus 520 is provided below, the same may be applied to apparatus 510 although a detailed description thereof is not provided solely in the interest of brevity. It is also noteworthy that, although the example implementations described below are provided in the context of WLAN, the same may be implemented in other types of networks.

Under various proposed schemes pertaining to anti-motion and anti-interference frame exchange sequences in wireless communications in accordance with the present disclosure, with apparatus 510 implemented in or as STA 110 and apparatus 520 implemented in or as STA 120 in network environment 100, processor 512 of apparatus 510 may determine to enable a FES. Moreover, processor 512 may communicate, via transceiver 516, with one or more other STAs by utilizing the FES in which preamble puncturing sounding and data transmission are performed in a same TXOP.

In some implementations, in determining, processor 512 may determine to enable the FES responsive to an adjacent channel interference exceeding a respective threshold. Alternatively, or additionally, in determining, processor 512 may determine to enable the FES responsive to a packet error rate exceeding a respective threshold. Alternatively, or additionally, in determining, processor 512 may determine to enable the FES responsive to a RSSI exceeding a respective threshold.

In some implementations, in communicating with the one or more other STAs, processor 512 may perform certain operations. For instance, processor 512 may perform the preamble puncturing sounding. Additionally, processor 512 may receive a respective beamforming feedback from each of the one or more other STAs to generate a sounding steering matrix. Moreover, processor 512 may apply the sounding steering matrix to the data transmission which occurs within the same TXOP as the preamble puncturing sounding.

In some implementations, in receiving the respective beamforming feedback from each of the one or more other STAs, processor 512 may receive the respective beamforming feedback from each of the one or more other STAs responsive to transmitting a single beamforming feedback report poll. Alternatively, processor 512 may receive the respective beamforming feedback from each of the one or more other STAs responsive to transmitting a separate beamforming feedback report poll to each of the one or more other STAs.

In some implementations, in communicating with the one or more other STAs, processor 512 may also exchange, prior to performing the preamble puncturing sounding, a RTS frame and a CTS frame with the one or more other STAs.

In some implementations, in communicating with the one or more other STAs, processor 512 may communicate a MU-PPDU with the one or more other STAs in a DL or UL traffic. Alternatively, in communicating with the one or more other STAs, processor 512 may communicate a TB-PPDU with the one or more other STAs in a DL or UL traffic.

In some implementations, in communicating with the one or more other STAs, processor 512 may communicate in a single-link operation or MLO.

Illustrative Processes

FIG. 6 illustrates an example process 600 in accordance with an implementation of the present disclosure. Process 600 may represent an aspect of implementing various proposed designs, concepts, schemes, systems and methods described above. More specifically, process 600 may represent an aspect of the proposed concepts and schemes pertaining to anti-motion and anti-interference frame exchange sequences in wireless communications in accordance with the present disclosure. Process 600 may include one or more operations, actions, or functions as illustrated by one or more of blocks 610 and 620. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively, in a different order. Furthermore, one or more of the blocks/sub-blocks of process 600 may be executed repeatedly or iteratively. Process 600 may be implemented by or in apparatus 510 and apparatus 520 as well as any variations thereof. Solely for illustrative purposes and without limiting the scope, process 600 is described below in the context of apparatus 510 implemented in or as STA 110 functioning as a non-AP STA (or an AP STA) and apparatus 520 implemented in or as STA 120 functioning as an AP STA (or a non-AP STA) of a wireless network such as a WLAN in network environment 100 in accordance with one or more of IEEE 802.11 standards. Process 600 may begin at block 610.

At 610, process 600 may involve processor 512 of apparatus 510 determining to enable a FES. Process 600 may proceed from 610 to 620.

At 620, process 600 may involve processor 512 communicating, via transceiver 516, with one or more other STAs by utilizing the FES in which preamble puncturing sounding and data transmission are performed in a same TXOP.

In some implementations, in determining, process 600 may involve processor 512 determining to enable the FES responsive to an adjacent channel interference exceeding a respective threshold. Alternatively, or additionally, in determining, process 600 may involve processor 512 determining to enable the FES responsive to a packet error rate exceeding a respective threshold. Alternatively, or additionally, in determining, process 600 may involve processor 512 determining to enable the FES responsive to a RSSI exceeding a respective threshold.

In some implementations, in communicating with the one or more other STAs, process 600 may involve processor 512 performing certain operations. For instance, process 600 may involve processor 512 performing the preamble puncturing sounding. Additionally, process 600 may involve processor 512 receiving a respective beamforming feedback from each of the one or more other STAs to generate a sounding steering matrix. Moreover, process 600 may involve processor 512 applying the sounding steering matrix to the data transmission which occurs within the same TXOP as the preamble puncturing sounding.

In some implementations, in receiving the respective beamforming feedback from each of the one or more other STAs, process 600 may involve processor 512 receiving the respective beamforming feedback from each of the one or more other STAs responsive to transmitting a single beamforming feedback report poll. Alternatively, process 600 may involve processor 512 receiving the respective beamforming feedback from each of the one or more other STAs responsive to transmitting a separate beamforming feedback report poll to each of the one or more other STAs.

In some implementations, in communicating with the one or more other STAS, process 600 may further involve processor 512 exchanging, prior to performing the preamble puncturing sounding, a RTS frame and a CTS frame with the one or more other STAs.

In some implementations, in communicating with the one or more other STAs, process 600 may involve processor 512 communicating a MU-PPDU with the one or more other STAs in a DL or UL traffic. Alternatively, in communicating with the one or more other STAs, process 600 may involve processor 512 communicating a TB-PPDU with the one or more other STAs in a DL or UL traffic.

In some implementations, in communicating with the one or more other STAs, process 600 may involve processor 512 communicating in a single-link operation or MLO.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   determining, by a processor of a station (STA), to enable a frame exchange sequence (FES); and
   communicating, by the processor, with one or more other STAs by utilizing the FES in which preamble puncturing sounding and data transmission are performed in a same transmission opportunity (TXOP),
   wherein the determining comprises determining to enable the FES responsive to:
      an adjacent channel interference exceeding a respective threshold; or
      a packet error rate exceeding a respective threshold; or
      a received signal strength indicator (RSSI) exceeding a respective threshold.

2. The method of claim 1, wherein the communicating with the one or more other STAs comprises:
   performing the preamble puncturing sounding;
   receiving a respective beamforming feedback from each of the one or more other STAs to generate a sounding steering matrix; and
   applying the sounding steering matrix to the data transmission which occurs within the same TXOP as the preamble puncturing sounding.

3. The method of claim 2, wherein the receiving of the respective beamforming feedback from each of the one or more other STAs comprises:
   receiving the respective beamforming feedback from each of the one or more other STAs responsive to transmitting a single beamforming feedback report poll; or
   receiving the respective beamforming feedback from each of the one or more other STAs responsive to transmitting a separate beamforming feedback report poll to each of the one or more other STAs.

4. The method of claim 2, wherein the communicating with the one or more other STAs further comprises:

exchanging, prior to performing the preamble puncturing sounding, a request-to-send (RTS) frame and a clear-to-send (CTS) frame with the one or more other STAs.

5. The method of claim 1, wherein the communicating with the one or more other STAs comprises communicating a multi-user physical-layer protocol data unit (MU-PPDU) with the one or more other STAs in a downlink (DL) or uplink (UL) traffic.

6. The method of claim 1, wherein the communicating with the one or more other STAs comprises communicating a trigger-based physical-layer protocol data unit (TB-PPDU) with the one or more other STAs in a downlink (DL) or uplink (UL) traffic.

7. The method of claim 1, wherein the communicating with the one or more other STAs comprises communicating in a single-link operation or multi-link operation (MLO).

8. An apparatus implementable in a station (STA), comprising:
   a transceiver configured to communicate wirelessly; and
   a processor coupled to the transceiver and configured to perform operations comprising:
      determining to enable a frame exchange sequence (FES); and
      communicating, via the transceiver, with one or more other STAs by utilizing the FES in which preamble puncturing sounding and data transmission are performed in a same transmission opportunity (TXOP),
   wherein the determining comprises determining to enable the FES responsive to:
      an adjacent channel interference exceeding a respective threshold; or
      a packet error rate exceeding a respective threshold; or
      a received signal strength indicator (RSSI) exceeding a respective threshold.

9. The apparatus of claim 8, wherein the communicating with the one or more other STAs comprises:
   performing the preamble puncturing sounding;
   receiving a respective beamforming feedback from each of the one or more other STAs to generate a sounding steering matrix; and
   applying the sounding steering matrix to the data transmission which occurs within the same TXOP as the preamble puncturing sounding.

10. The apparatus of claim 9, wherein the receiving of the respective beamforming feedback from each of the one or more other STAs comprises:
   receiving the respective beamforming feedback from each of the one or more other STAs responsive to transmitting a single beamforming feedback report poll; or
   receiving the respective beamforming feedback from each of the one or more other STAs responsive to transmitting a separate beamforming feedback report poll to each of the one or more other STAs.

11. The apparatus of claim 9, wherein the communicating with the one or more other STAs further comprises:
   exchanging, prior to performing the preamble puncturing sounding, a request-to-send (RTS) frame and a clear-to-send (CTS) frame with the one or more other STAs.

12. The apparatus of claim 8, wherein the communicating with the one or more other STAs comprises communicating a multi-user physical-layer protocol data unit (MU-PPDU) with the one or more other STAs in a downlink (DL) or uplink (UL) traffic.

13. The apparatus of claim 8, wherein the communicating with the one or more other STAs comprises communicating a trigger-based physical-layer protocol data unit (TB-PPDU) with the one or more other STAs in a downlink (DL) or uplink (UL) traffic.

14. The apparatus of claim 8, wherein the communicating with the one or more other STAs comprises communicating in a single-link operation or multi-link operation (MLO).

\* \* \* \* \*

14